United States Patent [19]

Deaton et al.

[11] 4,192,082

[45] Mar. 11, 1980

[54] ELECTRONIC WARFARE SIMULATOR

[75] Inventors: Ion V. Deaton, New Carrollton; Frederick H. Horman, College Park, both of Md.

[73] Assignee: The Singer Company, Binghamton, N.Y.

[21] Appl. No.: 970,291

[22] Filed: Dec. 18, 1978

[51] Int. Cl.² .............................................. G09B 9/00
[52] U.S. Cl. ..................................... 35/10.4; 343/18 E
[58] Field of Search ........................ 35/10.4; 343/18 E

[56] References Cited

U.S. PATENT DOCUMENTS

| | | | |
|---|---|---|---|
| 3,716,853 | 2/1973 | La Follette | 343/18 E X |
| 3,792,475 | 2/1974 | Smetana | 35/10.4 X |
| 3,838,201 | 9/1974 | Appling | 35/10.4 |
| 3,924,232 | 12/1975 | Burdi et al. | 343/18 E X |
| 4,146,892 | 3/1979 | Overman et al. | 343/18 E |

Primary Examiner—T. H. Tubbesing
Attorney, Agent, or Firm—Ronald Reichman; Jeff Rothenberg

[57] ABSTRACT

This invention relates to an electronic warfare simulator that is used to teach students how to operate passive electronic warfare equipment. A computer produces simulated radar signals that duplicate the characteristics of real world radar emitters. These characteristic signals are inputted to a plurality of pulse generators and mixers which act upon the signals and stimulate a pulse analyzer in order for the pulse analyzer to realistically activate electronic warfare equipment.

6 Claims, 4 Drawing Figures

ELECTRONIC WARFARE SIMULATOR

The U.S. Government has rights in this invention pursuant to contract No. F33657-76-C-0244 awarded by the Department of the Air Force.

BACKGROUND OF THE INVENTION

1. Field of the Invention

This invention relates to electronic circuits and more particularly to a system for stimulating electronic warfare equipment.

2. Description of the Prior Art

Man has engaged in war on the land, in the sea, in the air and in the electromagnetic spectrum. The electromagnetic spectrum has been used by the military for improved communications, the guidance of aircraft and missiles and the navigation of ships and planes. A nation seeks control of the electromagnetic spectrum because of the military's increasing dependency on its use for surveillance of potential enemy forces, communications between military units, detection of enemy military forces and the guidance and control of aeroplanes and missiles. With a mastery of the electromagnetic spectrum one adversary could achieve an indispensible ingredient for conquering an enemy or discouraging a potential aggressor.

There are two types of electronic warfare equipment, active and passive. Active equipment radiates its own energy whereas passive equipment does not. The passive category includes reconnaissance or surveillance equipment that detects and analyzes the electromagnetic radiation that is produced by radar and communications transmitters aboard aircraft, missiles, ships, satellites and ground installations. The reconnaissance devices may be used to identify and map the location of the emitters without in any way altering the nature of the signal they receive.

Certain types of passive electronic warfare systems enhance or change the nature of the electromagnetic energy reflected back to the enemy radars without generating any signal of their own. Active electronic warfare systems generate energy or delay the received signals to confuse the enemy's electromagnetic sensors.

A radar warning receiver is a passive type of electronic warfare equipment which is not used over the entire range of the electromagnetic spectrum. The radar warning receiver alerts the pilot or ship's captain that his aircraft or ship is being illuminated by a specific radar signal. Once the pilot or captain has been alerted that his vehicle has been detected by radar he can maneuver his vehicle to evade the threat or initiate certain electronic warfare countermeasures. Electronic countermeasures include all actions taken by the pilot or ship's captain to nullify the effective operation of the enemy's electronic warfare equipment. Some electronic countermeasures used are jamming the enemy's signal, the dropping of chaff and the launching of decoys.

Electronic warfare equipment is expensive, complex and difficult to learn how to operate. Simulators and other training devices have been invented to teach students to use and operate various types of equipment without undergoing the dangers that are inherent in the equipment's actual operation. For instance, it is a great deal safer and more economical to learn how to operate electronic warfare equipment on the ground in a simulator than in an actual aircraft or ship. Simulators streamline and cut the cost of training by allowing more intensive training time by permitting an instructor to control the various conditions that exist in the system being simulated. The instructor may make the student believe that enemy radar is looking at his airplane or ship or that a surface to air missile has been fired at his ship or airplane. The instructor observes and monitors the student's performance in handling the adverse conditions that are presented to him. If a student makes a mistake and does not take the proper countermeasures to avoid the surface to air missile, the student is not hurt and no damage is done to any property.

The systems used in the prior art do not simulate all the characteristics of the different types of threats that the pilot or ship's captain might see. Systems used in the prior art did not stimulate the analyzer characteristics of the aircraft's radar warning receivers and additional hardware was required when the signal strength of various radar emitters needed to be changed.

SUMMARY OF THE INVENTION

This invention overcomes the disadvantages of the prior art by providing a system that simulates and stimulates passive electronic warfare equipment. This system may be used to simulate a pulse activated radar warning receiver and an electronic support measures electronic warfare system. In the simulation of passive electronic warfare systems it is important to reproduce the characteristics of the electromagnetic waves that are used in radar systems, communication systems, navigation systems and weapons systems. Some characteristics of electromagnetic waves are: carrier frequency, pulse repetition frequency (also called pulse recurrence frequency), pulse width, the type of scan being employed, the rate of the scan, beam width, the polarization of the antenna and the signal strength. All of the above characteristics are usually displayed on a cathode ray tube (CRT) which is part of a passive electronic warfare system.

By looking at and interpreting the characteristics of the electromagnetic wave, (what is displayed upon the CRT screen), the pilot or ship's captain can determine the type of electronic warfare equipment that is monitoring his ship or airplane. The student then should divide the characteristics into three categories: (1) those that pose a direct threat to his vehicle, (2) those that are an indirect threat to his vehicle, and (3) those that pose no threat to his vehicle. Examples of radars that supply a direct threat to the student's vehicle are radars aboard position airborne intercepters, radars used in conjunction with surface to air missile sites and antiaircraft batteries.

Early warning radar, acquisition radar, height finder radar and V-beam radar are examples of indirect radar threats. Early warning radar is a high powered frequency radar that is used for long range detection of aircraft. It's main purpose is the early detection of possible threats. Hence, one of the characteristics of early warning radar would be relatively long pulse widths. Acquisition radars are used to provide range and azimuth information. The range and azimuth information is useful in tracking the student pilot's position. Acquisition radars are used in conjunction with antiaircraft artillery batteries or surface to air missiles. Acquisition radars have shorter pulse widths than early warning radars. Height finding radars are used to determine the altitude of the vehicle that is being observed. The pulse widths of height finder radars are longer than the pulse widths of early warning radars and shorter than the pulse widths of acquisition radars. Radars that pose a direct threat to the student's vehicle should be of primary concern to the pilot or captain.

Direct threat radars are used to detect an adversary, track him and continually supply updated information regarding his vehicle's position to a weapon system computer. A weapon system computer may automatically fire a weapon and alter the missile's course during its flight in order to hit the adversary's vehicle.

The following types of radar are examples of radars that would supply a direct threat to a vehicle: gunlayer radar, airborne intercepter radar, surface to air missile radar, monopulse radar and track while scan radar.

Gunlayer radar is a relatively low powered precision radar that utilizes a conical scan for tracking and either a helical or spiral scan for acquisition. The small beam width of the conical scan is used for tracking the vehicle and the helical or spiral scan allows a large area to be searched to find the vehicle.

Airborne intercepter radar uses a conical scan for its tracking mode and either raster or spiral scan for its target acquisition mode. The airborne intercepter radar usually has a higher frequency scan than the gunlayer radar.

Monopulse radar is a target tracking system that is utilized in conjunction with a surface to air missile. The monopulse radar obtains sufficient information from each transmitted pulse to update computers and reposition the radar's antenna. Instead of scanning a single beam, this radar uses a minimum for four separate beams which transmit signals together but receive signals independently. The computer compares the differences of the energy of the return beams and then determines what azimuth and elevation corrections should be made.

Over the horizon radar, airborne navigation radar, side looking radar, space surveillance radar and air surveillance radar are examples of radars that do not supply a threat to the student's vehicle. In order for a pilot or captain to effectively perform his mission he must be able to recognize the above types of radar that are illuminating or observing his vehicle. Once a pilot or captain detects a critical radar signal he should take the appropriate countermeasures like trying to jam the received signal. Without a knowledge of the types of radars that are used to detect an attacking force the attacking vehicles would be destroyed before they successfully completed their mission. Hence, pilots and captains must be taught how to successfully avoid enemy radar systems.

It is an object of this invention to provide a new and improved simulated electronic warfare system.

It is another object of this invention to provide a new and improved simulated electronic warfare system for simulating passive types of electronic warfare equipment.

It is a further object of this invention to provide a new and improved system for stimulating a pulse analyzer.

Other objects and advantages of this invention will become apparent as the following description proceeds, which description should be considered together with the accompanying drawings.

DESCRIPTION OF A PREFERRED EMBODIMENT

Figure 1:
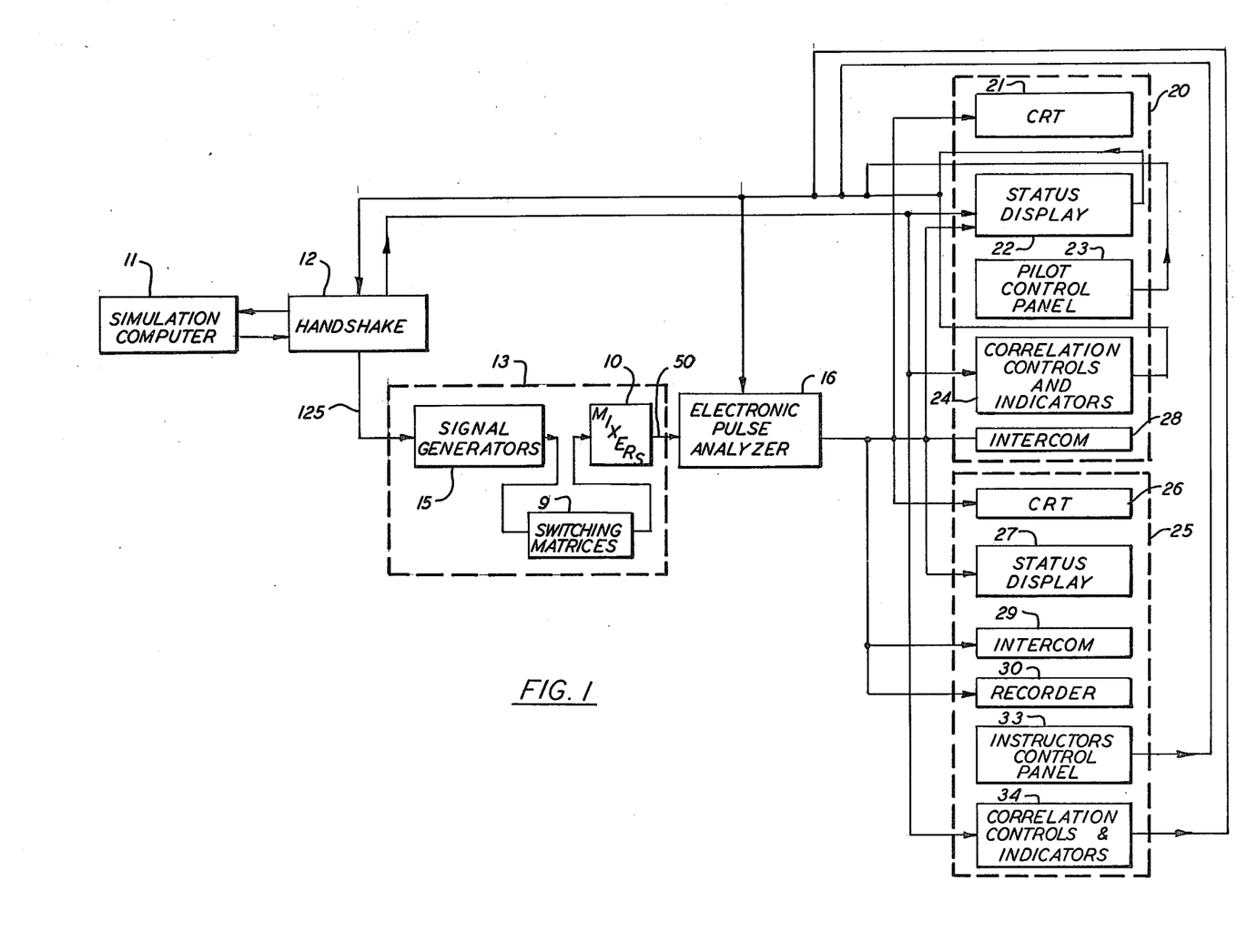
FIG. 1 is a block diagram showing how the apparatus of this invention is connected to the simulation computer and electronic warfare equipment.
Figure 2:
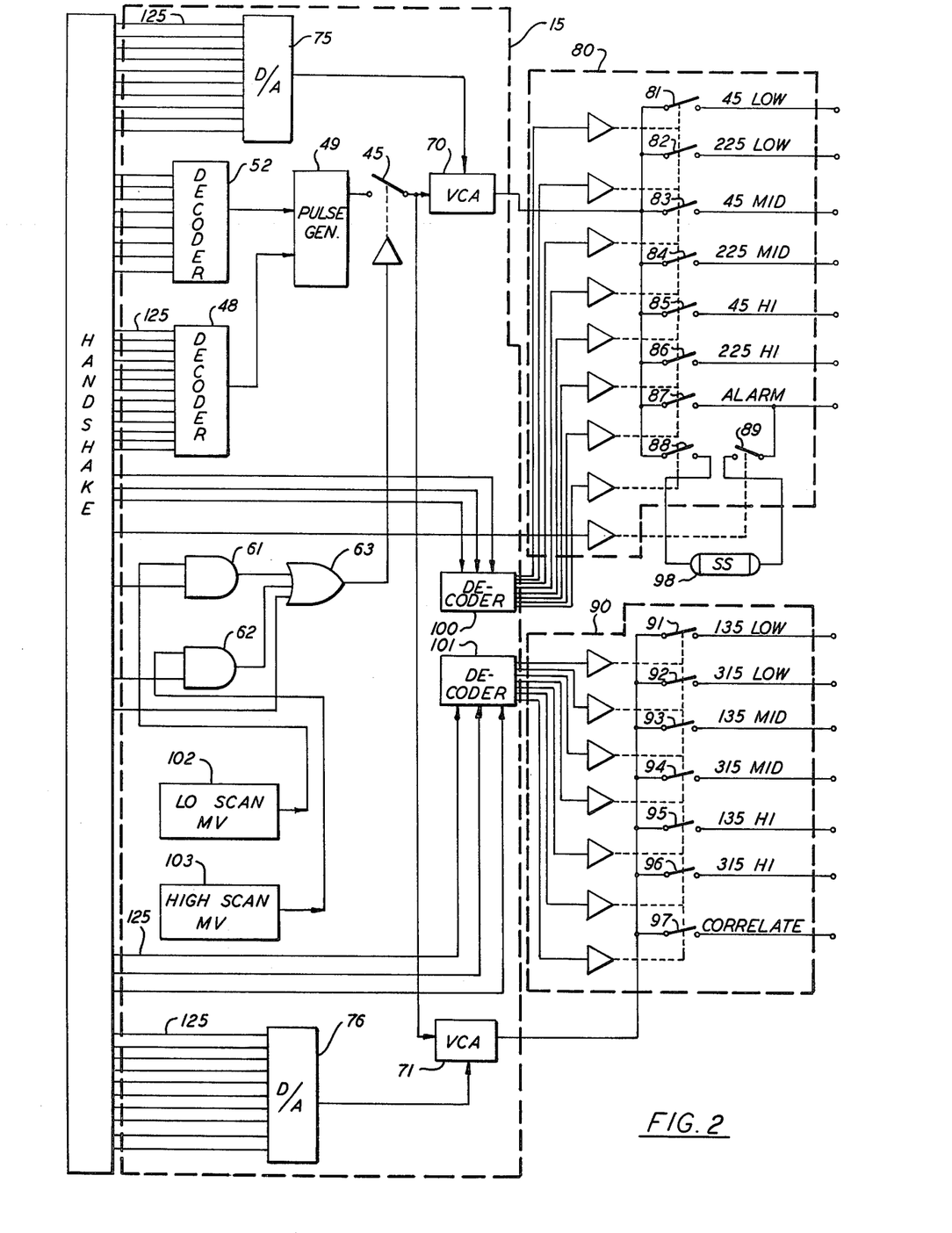
FIGS. 2 and 3 are logic diagrams showing the radio warning receiver simulator 13 of FIG. 1 in greater detail.

Referring now to the drawings in detail and more particularly to FIG. 1. The reference character 11 represents a general purpose digital computer. Computer 11 develops data that will be used for simulating the signals that passive electronic warfare (EW) equipment 20 might receive. Data that is developed by computer 11 is transferred to handshake 12 where the data generated by computer 11 is made electrically compatible with the remainder of this system. Video signal generators 15, switching matrices 9 and mixers 10 comprise the radio warning receiver and electronic warfare simulator 13 that is this invention. One of the outputs of handshake 12 is coupled to the inputs of signal generators 15 via cable 125 and the output of signal generators 15 is connected to the inputs of switching matrices 9. The output of switching matrices 9 is coupled to the inputs of mixers 10. Cable 125 comprises 51 lines whose connections are shown in FIG. 2. The number of signal generators used by this invention depends upon the number of emitters one wishes to simulate. One signal generator is used for each threat or emitter being simulated. Generator 15 produces a train of video pulses at its output whose pulse width and pulse recurrence frequency (also called pulse repetition frequency) depend upon the threat being simulated. Generators 15 will be more fully described in the description of FIG. 2.

Mixer 10 changes the video pulses by mixing them in a realistic manner to activate electronic pulse analyzer 16. Electronic pulse analyser 16 is purchased from the Applied Technology Division of the ITEK Corporation which is located at 645 Almanor Ave., Sunnyvale, Calif. 94086. Pulse analyzer 16 decodes its input signals and determines: the signal strength; the direction of arrival or antenna position; the pulse width; the pulse repetition frequency; the antenna scan rate; and the type of antenna scan. The output of electronic pulse analyzer 16 is coupled to CRT 21, status display 22, correlation controls and indicators 24, CRT display 26, status display 27, intercom 28, intercom 29 and recorder 30. CRT 21, status display 22, pilot control panel 23, correlation controls and indicators 24 and intercom 28 comprise the electronic warfare equipment 20 that is going to be stimulated by this invention. CRT 26, status display 27, intercom 29, instructors control panel 33, correlation controls and indicator 34, and recorder 30 comprise the instructor's station equipment 25 that will also be stimulated by this invention. The output of status display 22 is coupled to the input of handshake 12. The output of correlation controls and indicators 24 is coupled to the input of handshake 12 and the output of pilot control panel 23 is also coupled to the input of handshake 12.

Computer 11 produces test signals that are transmitted to handshake 12. Handshake 12 sends the signals to generator 15, switching matrices 9, mixers 10 and pulse analyzer 16. These signals are used to check out the electronic warfare equipment 20 and instructor station equipment 25 to insure that they are operable.

By pressing a button contained with status displays 22 and 27 the student and the instructor can check the audio cues and strobe patterns that are present on the instructor's station and EW equipment and ensure that the EW equipment and instructor's station are working properly. The self test may be used before the simulated flight or during the simulated flight. When the self test button is depressed computer 11 generates test codes that pass through handshake 12, generators 15, switching matrices 9, mixers 10, electronic pulse analyzer 16, equipment 20 and instructor's station 25.

The output of generator 15 is coupled to the input of switching matrices 9. The outputs of switching matrices are coupled to the inputs of mixers 10 and the outputs of mixers 10 are coupled to the inputs of electronic pulse analyzer 16 via cable 50. Cable 50 consists of 14 lines. The output of analyzer 16 is coupled to the input of CRT displays 21 and 26. CRT 21 and CRT 26 display coded strobes that identify the various radar scans that would be seen on a normal radar set. By looking at the CRT's the student may be located on the ground aboard an enemy ship, aboard an aircraft, or aboard a missile. The display information would inform the student or instructor that somebody is scanning the student's aircraft, i.e., it is looking at his aircraft with radar. The student or instructor may also determine the position of the simulated radar signal and what type of radar he is looking at. The simulated radar signal may be a signal produced by: long range surveillance radar, height finder radar or missile control radar, etc. The length of the radar strobe on CRT's 21 and 26 would be an indication of the relative signal strength of the radar that is observing the student's vehicle. Thus, by looking at CRT's 21 or 26 the student and the instructor can determine what type of threats or enemy armaments are looking at the student's vehicle at this particular moment. The output of pulse analyzer 16 is also coupled to the input of digital status displays 22 and 27. Digital status displays 22 and 27 are actually a plurality of indicators that have legends affixed thereto. The indicators can be illuminated or not illuminated, they can be flashing, or not flashing.

Computer 11 causes analyzer 16 to control the type of illumination on indicators 24 and 34. Indicators 24 and 34 change state to indicate various types of things. For instance, if the indicator light is lit, it might indicate the presence of a specific threat. The digital status displays 22 and 27 would inform the pilot or instructor what threats are being detected and what operating modes they are in. In other words, what enemy radar emitters are being detected. The status displays would also inform the instructor and student pilot of the frequency of the radar, the type of threat, the type of scan being utilized and the displays would give an indication of the pulse recurrence frequency of the radar. Analyzer 16 also has an output coupled to the input of intercom 28 and intercom 29. Intercom 28 and intercom 29 are used by the pilot and instructor for listening to the sounds that are produced by the simulated radar emitters. The output of analyzer 16 is coupled to the input of recorder 30 where the entire data received from generator 15 may be reproduced. The output of pilot control panel 23 is coupled to the input of pulse analyzer 16 and the input of handshake 12. One of the controls on pilot control panel 23 permits the student pilot to vary the volume on intercom 28 so that he may listen to the audio characteristics of a particular emitter and determine the sound characteristics unique to that emitter.

The output of correlation controls and indicators 24 are coupled to the input of handshake 12 and pulse analyzer 16. The correlation control panel would permit the student pilot to select the threat or threats he wants to monitor on CRT 21. When the student pilot selects high priority threats, any lower priority threats such as early warning or other long range emitters that pose no immediate threat would be deleted from CRT 21 and CRT 26. The instructor observes the student pilot to see if the student monitors the threats that pose the most immediate harm to his vehicle.

Since instructor's station 26 contains all of the EW equipment 20 used by the student pilot, the instructor may observe the student pilot's reaction to the various electronic warfare threats. The output of instructor's control panel 33 is connected to one of the inputs of handshake 12. The instructor's control panel 33 permits the instructor to control the signal strength of the sound heard on intercom 29. Correlation controls and indicator 24's input is connected to one of the outputs of handshake 12 and the output of correlation control and indicator 24 is connected to the input of handshake 12. The pilot control panel 23 is only used for changing the volume of the intercom. The correlation control 24 is used to select the type of threat that will be observed. The indicators on panel 24 and 34 are used to determine the acquisition sector of the simulated emitter, i.e., the indicator lights when the vertical and horizontal radar beams are looking at each other (they are perfectly lined up).

The apparatus of this invention is radar warning receiver and electronic warfare simulator 13 that stimulates pulse analyzer 16 with simulated radar signals that contain all the characteristics found in real world radar emitter signals. Pulse generators 15 receive the aforementioned signals and generate all aural and display signals that will be switched by switching matrices 9, mixed by mixers 10 and transmitted to analyzer 16 which drives electronic warfare equipment 20 and instructor's station 25. This permits the characteristics and anamolies of pulse analyzer 16 to be automatically duplicated and a different pulse analyzer may be substituted for the original pulse analyzer without changing the hardware that feeds the analyzer. The foregoing would not be possible if the analyzer characteristics were modeled in software and aural display signals were generated by simulation hardware.

FIG. 2 shows signal generator 15 in greater detail and its interconnection to handshake 12 via the 51 lines that comprise cable 125. Eight parallel lines transmit an eight bit code, that represents the pulse width of the simulated radar signal (the interval of time during which the simulated radar transmitter is energized) from handshake 12 to decoder 52. Decoder 52 decodes the 8 bit code. The electronic pulse analyzer decodes the pulse width of the radar signal to tell the student the type of radar signal he is receiving. Radar signals with narrow pulse widths of one microsecond or less indicate precision radars like navigation and fire control radars. Whereas, radar signals with wide pulse widths indicate long range or early warning radars.

The pulse recurrence frequency of the simulated radar signal is transmitted from handshake 12 to decoder 48 via thirteen parallel lines. The aforementioned lines transmit a 13 bit digital code that represents the pulse recurrence frequency of the radar signal (different types of radar have different pulse recurrence frequencies). The 13 bit code is decoded by decoder 48.

The output of decoder 52 and decoder 48 are coupled to the inputs of pulse generator 49. The pulses being outputted by pulse generator 49 represent the simulated radar signal. The output of pulse generator 49 is coupled to one of the terminals of solid state switch 45. The other terminal of switch 45 is coupled to voltage controlled attenuator (VCA) 70. The opening and closing of switch 45 acts as an antenna scan control. Thus, switch 45 causes the formation of a pulse train that is transmitted in bursts of pulses that duplicate those that would be obtained from typical radar antenna scans. Switch 45 is controlled by the output of OR gate 63, hence, switch 45 will be closed when OR gate 63 is enabled.

OR gate 63 will be enabled whenever there is a logic one on any one of its three inputs. The first example would be when AND gate 61 is enabled. AND gate 61 has two inputs, one of which is the output of low scan multivibrator 102 and the other input is an output line of handshake 12 that transmits signals which represent a low scan antenna. This signal will only be present when a few cycles per second pulse is wanted and this is usually done to simulate certain tracking radar scan rates. The second example is when AND gate 62 is enabled. AND gate 62 will be enabled when it receives a pulse from high scan multivibrator 103 and the high scan signal is transmitted from handshake 12. The third example is when a positive pulse is present at the third input to OR gate 63. For other scan rates and the check out of electronic pulse analyzer 16, EW equipment 20 and instructor's station 25, computer 11 will cause a positive pulse to be transmitted to the third input of OR gate 63. Thus, gates 61, 62 and 63 control the number of pulses that are passed by switch 45. When OR gate 63 is not enabled, switch 45 will be open and no video pulses will be transmitted to voltage controlled attenuators 70 and 71. Therefore, when switch 45 is closed VCA 70 and VCA 71 will output a scan rate signal.

One of the outputs (10 lines) of handshake 12 is coupled to the input of digital to analog converter (D/A) 75. The output of D/A 75 is coupled to one of the inputs of VCA 70. Another one of the outputs (10 lines) of handshake 12 is coupled to the input of digital to analog converter 76. The output of D/A 76 is coupled to one of the inputs of voltage controlled attenuator 71. The signal strength of the simulated radar signal is transmitted in digital code from handshake 12 to the inputs of digital to analog converters 75 and 76. The magnitude of the digital signal that is inputted to D/A 75 and 76 is determined by computer 11 and it is a function of the signal strength of the simulated threat or the power level of the transmitted radar. The analog signal that is inputted to D/A 75 and 76 is also a function of the simulated range of the radar and the direction of arrival of the radar signal at the aircraft's EW equipment. The signal strength can also be made a function of other parameters in more sophisticated applications by changing the software program without the need to change any of the invention hardware. D/A's 75 and 76 receive digital signal and convert it into an analog signal. VCA 70 attenuates the video pulse amplitudes of the signals received via switch 45 with the signal strength signal received from the output of D/A 75 and VCA 71 attenuates the video pulse amplitudes of the signal received via switch 45 with the signal strength signal received from the output of D/A 76.

The radar warning receiver found aboard an aircraft normally has four directional antennas. The antennas are arranged in a manner in which the antennas are ninety degrees apart. The tip of the first antenna would be 45 degrees from the nose of the aircraft and the tip of the second antenna would be 135 degrees from the nose of the aircraft. The tip of the third antenna would be 225 degrees from the nose of the aircraft and the tip of the fourth antenna would be 315 degrees from the nose of the aircraft. Thus if a radar emitter is emitting a signal at 80 degrees from the nose of the aircraft it would be received by the antenna positioned at 45 degrees and the antenna positioned at 135 degrees. The output of VCA 70 is coupled to the input of switching matrix 80 and the output of VCA 71 is coupled to the input of switching matrix 90. The outputs of VCA 70 and VCA 71 represent, among other things, the signal strength and azimuth or direction of arrival of the simulated radar emitter. The switching matrices 80 and 90 are used to receive the simulated radar signal and output the received signal on that output line of matrices 80 and 90 that corresponds to the correct direction and frequency of the simulated radar signal. Low, medium and high frequency bands are simulated by this invention. Switching matrix 80 comprises switches 81 through 89 and switching matrix 90 comprises switches 90 through 96.

The input to decoder 100 is three parallel lines which are connected to handshake 12 and the input to decoder 101 is three parallel lines which are also connected to handshake 12. The 8 lines of decoded output of decoder 100 are coupled to the input of switching matrix 80 and the lines of decoded output of decoder 101 are coupled to the input of switching matrix 90. Decoders 100 and 101 respectively receive a 3 bit code from handshake 12. These are decoded by decoder 100 and 101 and determine which switches in matrices 80 and 90 will be closed at a given instant of time. The signals produced by VCA 70 only sit on the inputs to switching matrix 80 and the signals produced by VCA 71 only sit on the inputs to switching matrix 90. The foregoing signals only pass through matrix 80 when a signal arrives from decoder 100 and the foregoing signals only pass through matrix 90 when a signal arrives from decoder 101.

Let us assume that a low frequency, low scan signal between 45 and 135 degrees was simulated by this system. In this case the output of OR gate 63 would close switch 45 for some time interval as determined by the type of antenna scan being simulated. In this case, AND gate 61 will be enabled since the low scan signal would be transmitted from handshake 12 and a signal will arrive from free running low scan multivibrator 102. The output of AND gate 61 will enable OR gate 63 and the output of OR gate 63 will cause switch 45 to close. This will cause VCA 70 and VCA 71 to have an output which will be placed on the input of switching matrices 80 and 90. When switching matrices 80 and 90 receive a proper code from decoders 100 and 101 and the simulated radar signal is a low frequency signal between 45 and 135 degrees, switches 81 and 91 would be closed. If a proper code is received from decoders 100 and 101 and a low frequency band high scan radar is being emitted between 135 degrees and 225 degrees, AND gate 62 would be enabled causing the enabling of OR gate 63 and the closing of switches 82 and 91. When the proper code is received from decoders 100 and 101 and the simulated low frequency radar signal is between 225 degrees and 315 degrees switches 82 and 92 would be closed. If a proper code is received from decoders 100 and 101 and the simulated radar signal is of low frequency between 315 degrees and 45 degrees (going clockwise) switches 92 and 81 would be closed. Switch 81 is used for passing low frequency signals that are received by the 45 degree antenna and switch 82 is used for passing low frequency signals that would be received by the 225 degree antenna. Switch 83 would be used for passing a mid frequency signal that would be received by the 45 degree antenna. Switch 84 would be used for passing a mid frequency signal that would be received by the 225 degree antenna and switch 85 would be used for passing a high frequency signal that is received by the 45 degree antenna. Switch 86 would be closed when a high frequency signal is received by the 225 degree antenna and switch 91 would be closed when a low frequency signal is received by the 135 degree antenna. Switch 92 would be closed when the 315 degree antenna receives a low frequency signal, and switch 93 would be closed when the 135 degree antenna receives a mid-frequency signal. Switch 94 would be closed when the 315 degree antenna receives a mid-frequency signal and switch 95 would be closed when the 135 degree antenna receives a high frequency signal. Switch 96 would be closed with the 315 degree antenna receives a high frequency signal. When a high scan signal is being generated AND gate 62 will be enabled. AND gate 62 has two inputs, the output of high scan multivibrator 103 and the high scan enable signal that is received from handshake 12. Once AND gate 62 is enabled it will cause the enabling of OR gate 63. The output of OR gate 63 causes antenna scan control switch 45 to close which in turn causes VCA 70 and 71 to produce a signal that is outputted to switching matrices 80 and 90. When a very low scan, steady scan or variable scan signal is being simulated a positive pulse is transmitted from handshake 12 to the third input of OR gate 63. This signal will cause OR gate 63 to be enabled and switch 45 will close. The closing of switch 45 will cause VCA 70 and VCA 71 to have an output pulse which would be present at the inputs of switching matrices 80 and 90. It will be noted that there is no necessary correlation between the frequency band being simulated and the scan rate being simulated. In other words, any one of the three scan inputs to OR gate 63 could be activated when a low frequency band signal is being simulated. The same statement holds for simulation of a mid-frequency band or high frequency band signal.

If the simulated radar signal was being emitted from exactly 45 degrees, 135 degrees, 225 degrees or 315 degrees from the nose of the aircraft only one antenna would receive the signal and only one of switches 81, 82, 83, 84, 85, 86, 91, 92, 93, 94, 95 and 96 would be closed. By looking at CRT 21 or CRT 26 the student pilot or instructor is able to determine the relative signal strength, scan type and frequency of the signal. By looking at the strobe's position on the CRT the student or instructor may determine the direction from which signals came. For instance, if the signal was at 90 degrees from the nose of the aircraft the strobe would be shown on CRT 21 and 26 at 90 degrees or 3o'clock. The outputs of switching matrices 80 and 90 are coupled to the input of mixers 10 (FIG. 1).

Analyzer 16 also analyzes the pulse repetition frequency of the simulated signal. This information is outputted to intercoms 28 and 29 in the form of a sound at a particular frequency. Mixers 10 scan the signal as a function of the signal's direction of arrival or azimuth. Pulse analyzer 16 in FIG. 1 generates a signal that will cause CRTs 21 and 26 to generate a strobe that will point in the direction that the simulated signal is coming from. The sound of the simulated signal is a cue to the student pilot or instructor of what type of radar is observing his aircraft, i.e., air to air missile, surface to air missile, antiaircraft artillery, etc. Computer 11 (FIG. 1) is computing the signal strength to adjacent antennas at all times. This is done because in the real world the signal is usually seen by two antennas. For instance, if the signal was coming from 90 degrees of the nose of the aircraft, the computer 11 would transmit a signal to handshake 12. Handshake 12 would change the level of this signal and transit it to the input of D/A 75. D/A 75 would convert its digital input into an analog signal that would be transmitted to the input of VCA 70. Computer 11 would also transmit another signal to handshake 12. Handshake 12 would change the level of this signal and transmit it to the input of D/A 76. D/A 76 would convert its digital input into an analog signal that would be transmitted to the input of VCA 71. In this instance the output signals of D/A 75 and D/A 76 have the same strength, because the signals originate half way between the 45 degree and 135 degree antenna.

When the proper three bit code is received by decoder 100 and decoder 101 some switches contained in matrices 80 and 90 will be closed. Mixer 10 of FIG. 1 will receive a pulse which it mixes and transmits to analyzer 16. Thereupon, analyzer 16 causes a special audio tone to be heard on intercoms 28 and 29 and a light to be lit on status displays 22 and 27. At this time the instructor can observe the student's reaction to the impending harm or the immediate threat. Single shot 98 is coupled to switches 88 and 89. When the proper three bit code is outputted by decoder 100 switch 87 will close. Single shot 98 may be fired for a preset interval to provide an aural alarm to the student pilot alerting him to the existence of some new critical threat condition. Switch 87 is closed when the simulated aircraft is being observed by the surface to air missile radar. The surface to air missile may be only tracking the student, that is it is only illuminating his aircraft and not ready to fire at the student's vehicle. However, when the surface to air missiles radar is in guidance mode the surface to air missile would be ready to fire at the student's aircraft. When the student receives the aforementioned signal switch 97 will be closed. This condition is known as a correlate input and it should indicate to the student pilot that he is probably going to be fired upon. The alarm that sounds when switches 88 and 89 are closed will only be generated when this system is in the correlate mode. For each emitter that is simulated the electronics shown in FIG. 2 are duplicated. Thus if 16 threats were simulated the electronics shown in FIG. 2 would be reproduced 16 times. In this invention a maximum of 16 threats are being simulated at any given instant in time. For each threat being simulated, there will be 14 outputs going to the inputs of mixers 10 in FIG. 1. In order to produce 16 threats, 16 signal generators and 14 mixers 10 are required.

Figure 3:
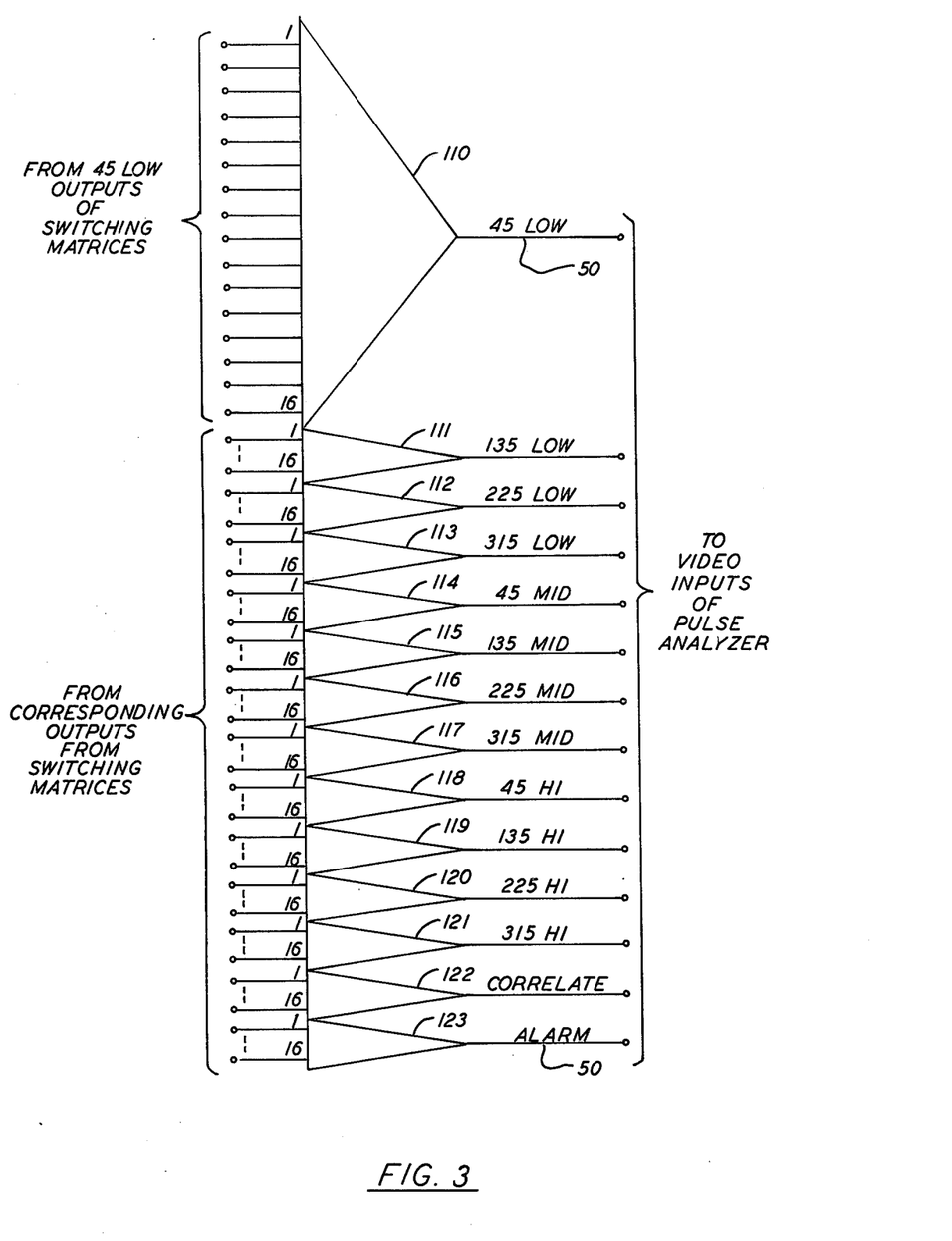

FIG. 3 shows the mixer array for a 16 emitter three frequency band system. In such a system there would be 16 signal generators 15 and 14 mixers 10. Mixers 110 through 123 each have 16 inputs because there are 16 threats being simulated, there are 16 inputs to the mixers. The mixers would receive one input from each of the output lines of FIG. 2. Thus mixer 110 would receive all the signals that are present when switch 81 is closed, that is, all of the low frequency carrier signals received by the 45 degree antenna would be present on the input lines to mixer 110. Mixer 111 would receive all the 135 degree antenna's low frequency carrier signals and mixer 112 would receive all the 225 degree antenna's low frequency carrier signals. Mixer 113 would receive the low frequency signals that the 315 degree antenna receives. Thus mixers 110, 111, 112 and 113 would represent the low frequency carrier band or band one.

Mixer 114 would receive the mid-frequency carrier signals received by the 45 degree antenna and mixer 115 would receive the mid-frequency carrier signals received by the 135 degree antenna. Mixer 116 receives the mid-frequency carrier signals received by the 225 degree antenna, and mixer 117 receives the mid-frequency carrier signals received by the 315 degree antenna. Mixers 114, 115, 116 and 117 comprise the mid-frequency carrier band or band 2.

Mixer 118 receives the high frequency carrier signals received by the 45 degree antenna and mixer 119 receives the high frequency carrier signals received by the 135 degree antenna. Mixer 120 receives the high frequency carrier signals received by the 225 degree antenna and mixer 121 receives the high frequency carrier signals received by the 315 degree antenna. Mixers 118, 119, 120 and 121 comprise the high frequency carrier band or band 3. Mixer 122 receives the correlate signals and mixer 123 receives the alarm signals. The outputs of mixers 110 through 123 are coupled to the inputs of pulse analyzer 16 (FIG. 1) via cable 50.

Figure 4:
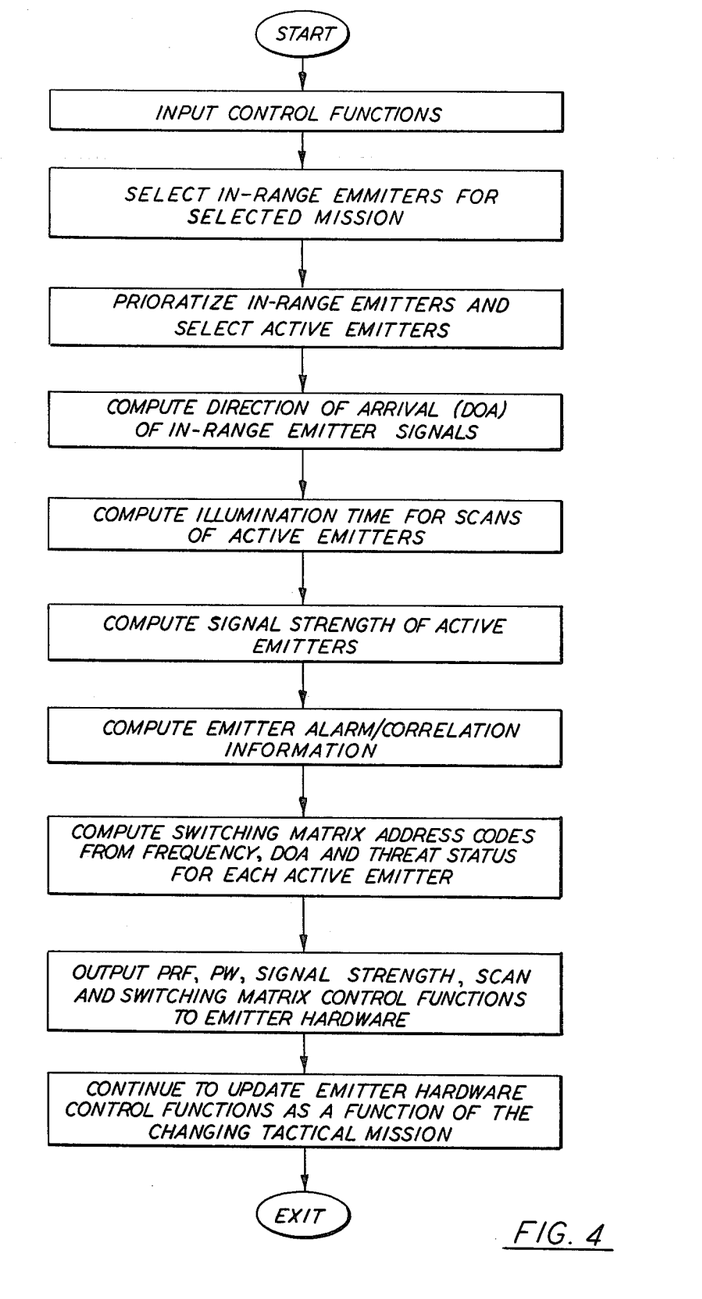
FIG. 4 is a flow chart showing the steps computer 11 of FIG. 1 employs to generate radar emitter signals.

FIG. 4 shows a flow chart illustrating the steps computer 11 (FIG. 1) performs to simulate the radar emitters.

The above specification describes a new and improved radar warning receiver and electronic warfare simulator. It is realized that the above description may indicate to those skilled in the art additional ways in which the principles of this invention may be used without departing from its spirit. It is, therefore, intended that this invention be limited only by the scope of the appended claims.

What is claimed is:

1. A radar warning simulation system that receives information regarding radar emitter characteristics from a digital computer said system comprising:
   (a) a plurality of means for generating signals coupled to the output of said computer, each of said generating means being coupled to information that pertains to a different radar emitter so that each of said generating means will produce a train of video pulses at its output having a signal strength, antenna position, pulse width and pulse recurrence frequency equal to the corresponding radar emitter information characteristics; and
   (b) a purality of switching matrices whose inputs are coupled to the outputs of said generators, each one of said switching matrixes being coupled to a different signal generator to permit each of said switching matrixes to select the antenna position and frequency band of said generators signals so that each one of said switching matrixes may select and output their output signals according to the antenna position and frequency of the input signals; and
   (c) a plurality of means for mixing whose inputs are coupled to the outputs of said switching matrices, wherein said mixing means add like input signals and arrange the signals at their outputs according to the frequency and antenna position of the input signal, whereby the outputs of said mixing means activate an electronic pulse analyzer which stimulates electronic warfare equipment permitting a student to learn how to operate electronic warfare equipment.

2. The system claimed in claim 1 wherein said plurality of mixing means is a plurality of mixers.

3. The system claimed in claim 1 wherein said plurality of means for generating is a plurality of signal generators.

4. The system claimed in claim 3 wherein said signal generator further comprises:
   (a) a first decoder coupled to said computer, wherein said first decoder decodes the information received from said computer and determines the pulse width of the simulated radar emitter;
   (b) a second decoder coupled to said computer, wherein said second decoder decodes the information received from said computer and determines the pulse repetition frequency of the simulated radar emitter;
   (c) a pulse generator coupled to the outputs of said first and second decoders, wherein said pulse generator produces output pulses having a particular pulse width and pulse repetition frequency;
   (d) a first digital to analog converter coupled to the output of said computer, wherein said first digital to analog converter receives a digital signal from said computer and converts that signal into an analog signal that has the same signal strength as would be received at the simulated antenna;
   (e) a second digital to analog converter coupled to the output of said computer, wherein said second digital to analog converter receives a digital signal from said computer and converts that signal into an analog signal that has the same signal strength as would be received at an adjacent simulated antenna;
   (f) switching means coupled to the output of said pulse generator for formatting a pulse train that will be transmitted in burst of pulses that duplicate the antenna scan of the simulated radar emitter;
   (g) controlling means whose input is coupled to the output of said computer and whose output is coupled to the input of said switching means, wherein said controlling means controls the opening and closing of said switching means;
   (h) a first voltage controlled attenuator whose inputs are coupled to the output of said switching means and said first digital to analog converter, wherein said first attenuator attenuates the signals received from said switching means in direct proportion to the signal received from said first digital to analog converter and said first attenuator's output signals represent the signals received by an antenna of an electronic warfare system;
   (i) a second voltage controlled attenuator whose inputs are coupled to the output of said switching means and said second digital to analogue converter, wherein said second attenuator attenuates the signals received from said switching means in direct proportion to the signal received from said second digital to analog converter and said second attenuator's output signals represent the signals received by an adjacent antenna of an electronic warfare system;
   (j) a third decoder whose input is coupled to the output of said computer, and whose output is coupled to said switching matrix, wherein said third decoder determines the frequency band and antenna position of said simulated radar emitter; and (k) a fourth decoder whose input is coupled to the output of said computer and whose output is coupled to said switching matrix, wherein said third decoder determines the frequency and antenna position of said simulated radar emitter.

5. The system claimed in claim 4 wherein said switching means is a solid state switch.

6. The system claimed in claim 4 wherein said controlling means comprises:
- (a) a first multivibrator that has a free running low frequency output pulse;
- (b) a second multivibrator that has a free running high frequency output pulse;
- (c) a first AND gate whose inputs are coupled to the output of said first multivibrator and the output of said computer, wherein said first AND gate will be enabled when a low scan enable signal is received from said computer and a pulse is received from said first multivibrator;
- (d) a second AND gate whose inputs are coupled to the output of said second multivibrator and the output of said computer, wherein said second AND gate will be enabled when a high scan enable signal is received from said computer and a pulse is received from said second multivibrator;
- (e) an OR gate whose inputs are coupled to the outputs of said first AND gate, said second AND gate and an output of said computer that represents scan enable signals, wherein the output of said OR gate is coupled to the input of said switching means.

* * * * *